United States Patent
Anderson

(10) Patent No.: US 9,414,326 B2
(45) Date of Patent: *Aug. 9, 2016

(54) POWER CONTROL IN A WIRELESS NETWORK

(71) Applicant: Intellectual Ventures Holding 81 LLC, Las Vegas, NV (US)

(72) Inventor: Nicholas W. Anderson, Exeter (GB)

(73) Assignee: Intellectual Ventures II LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/713,719

(22) Filed: May 15, 2015

(65) Prior Publication Data

US 2015/0264653 A1  Sep. 17, 2015

Related U.S. Application Data

(63) Continuation of application No. 13/727,153, filed on Dec. 26, 2012, now Pat. No. 9,055,586, which is a continuation of application No. 10/917,968, filed on Aug. 12, 2004, now Pat. No. 8,897,828.

(51) Int. Cl.
  *H04B 7/00*  (2006.01)
  *H04W 52/24*  (2009.01)
  (Continued)

(52) U.S. Cl.
  CPC ............ *H04W 52/242* (2013.01); *H04W 52/06* (2013.01); *H04W 52/221* (2013.01); *H04W 52/24* (2013.01); *H04W 52/241* (2013.01); *H04W 72/0473* (2013.01);
  (Continued)

(58) Field of Classification Search
  USPC .................. 455/522, 68, 69, 296, 135, 226.3, 455/277.2, 115.3, 126, 127.1, 127.2, 67.11, 455/434, 436; 370/331, 320, 335, 342, 318, 370/392, 252, 276, 280; 375/147, 130
  See application file for complete search history.

(56) References Cited

U.S. PATENT DOCUMENTS

| 5,257,283 A | 10/1993 | Gilhousen et al. |
| 5,719,583 A | 2/1998 | Kanai |

(Continued)

FOREIGN PATENT DOCUMENTS

| CN | 1159720 A | 9/1997 |
| CN | 1343400 A | 4/2002 |

(Continued)

OTHER PUBLICATIONS

"Recommendation ITU-R M.1225: Guidelines for Evaluation of Radio Transmission Technologies for IMT-2000," International Telecommunication Union/ITU Radiocommunication Sector, Jan. 1, 1997, Rec. ITU-R M.1225, pp. 1-61.

(Continued)

*Primary Examiner* — Dominic E Rego
(74) *Attorney, Agent, or Firm* — Volpe and Koenig, P.C.

(57) ABSTRACT

A first network device may transmit a first indication of a transmission power level of the first network device so that a user equipment (UE) can determine a pathloss. The first network device may also transmit, to the UE, a second indication of whether accumulation of transmit power control (TPC) commands is enabled. The first network device may also transmit, on a single channel to the UE, a TPC command and scheduling information related to a shared uplink channel.

12 Claims, 4 Drawing Sheets

(51) Int. Cl.
  *H04W 52/06* (2009.01)
  *H04W 52/22* (2009.01)
  *H04W 72/04* (2009.01)
  *H04W 72/12* (2009.01)
  *H04W 52/08* (2009.01)
  *H04W 52/10* (2009.01)
  *H04W 52/12* (2009.01)

(52) U.S. Cl.
  CPC ..... *H04W 72/1268* (2013.01); *H04W 72/1289* (2013.01); *H04W 52/08* (2013.01); *H04W 52/10* (2013.01); *H04W 52/12* (2013.01); *H04W 52/243* (2013.01)

(56) References Cited

U.S. PATENT DOCUMENTS

| | | | |
|---|---|---|---|
| 5,887,245 | A | 3/1999 | Lindroth et al. |
| 6,085,106 | A | 7/2000 | Sendonaris et al. |
| 6,137,993 | A | 10/2000 | Almgren et al. |
| 6,442,398 | B1 | 8/2002 | Padovani et al. |
| 6,512,931 | B1 | 1/2003 | Kim et al. |
| 6,597,723 | B1 | 7/2003 | Zeira et al. |
| 6,628,956 | B2 | 9/2003 | Bark et al. |
| 6,804,512 | B1* | 10/2004 | Baker et al. .......... 455/423 |
| 6,823,194 | B2 | 11/2004 | Haim |
| 6,983,166 | B2 | 1/2006 | Shiu et al. |
| 7,190,688 | B1 | 3/2007 | Kamel et al. |
| 7,277,721 | B2 | 10/2007 | Okumura et al. |
| 8,134,994 | B2 | 3/2012 | Liu et al. |
| 2001/0036823 | A1 | 11/2001 | Van Lieshout et al. |
| 2003/0032411 | A1 | 2/2003 | Kim et al. |
| 2003/0103530 | A1 | 6/2003 | Durastante |
| 2003/0134655 | A1 | 7/2003 | Chen et al. |
| 2004/0137860 | A1 | 7/2004 | Oh et al. |
| 2004/0141483 | A1 | 7/2004 | Zeira et al. |
| 2004/0162093 | A1 | 8/2004 | Bevan et al. |
| 2004/0171387 | A1 | 9/2004 | Miyoshi et al. |
| 2004/0190485 | A1* | 9/2004 | Khan ............ 370/349 |
| 2004/0203987 | A1 | 10/2004 | Butala |
| 2005/0003846 | A1 | 1/2005 | Anderson |
| 2005/0025056 | A1 | 2/2005 | Chen et al. |
| 2005/0041673 | A1 | 2/2005 | Jiang et al. |
| 2005/0073973 | A1 | 4/2005 | LaRoia et al. |
| 2005/0130690 | A1 | 6/2005 | Shinozaki |
| 2005/0136961 | A1 | 6/2005 | Simonsson et al. |
| 2005/0176455 | A1 | 8/2005 | Krishnan et al. |
| 2005/0207359 | A1 | 9/2005 | Hwang et al. |
| 2007/0081492 | A1 | 4/2007 | Petrovic et al. |
| 2009/0028111 | A1 | 1/2009 | Chao et al. |
| 2012/0113808 | A1* | 5/2012 | Washburn ............ 370/230 |
| 2013/0142217 | A1* | 6/2013 | Lomp ............ 375/130 |

FOREIGN PATENT DOCUMENTS

| | | | |
|---|---|---|---|
| CN | 1128515 | C | 11/2003 |
| EP | 1071227 | A2 | 1/2001 |
| EP | 1176739 | A1 | 1/2002 |
| EP | 1367740 | A1 | 12/2003 |
| GB | 2350522 | A1 | 11/2000 |
| JP | 2004040187 | A2 | 2/2004 |
| JP | 2004248247 | A | 2/2004 |
| JP | 2004289842 | A | 10/2004 |
| WO | 91/07037 | A1 | 5/1991 |
| WO | 9631009 | A1 | 10/1996 |
| WO | 9907105 | A2 | 2/1999 |
| WO | 00/57574 | A1 | 9/2000 |
| WO | 0057574 | A1 | 9/2000 |
| WO | 0108322 | A1 | 2/2001 |
| WO | 0184740 | A2 | 11/2001 |
| WO | 03010903 | A1 | 2/2003 |
| WO | 03036816 | A1 | 5/2003 |

OTHER PUBLICATIONS

Communication pursuant to Article 94(3) EPC from European Patent Application No. 05 801 370.7-1246 dated Dec. 30, 2009.
European Search Report Dated Dec. 2, 2010 from European Application No. 10185576.5-1246.
Great Britain Search Report mailed May 14, 2002, for Great Britain Application No. 0125504.1 filed Oct. 24, 2001, 1 page.
International Search Report mailed Dec. 22, 2005, for PCT Application No. PCT/EP2005/053931 filed Aug. 10, 2005, 4 pages.
International Search Report mailed Jan. 21, 2003, for PCT Application No. PCT/GB02/04811 filed Oct. 24, 2002, 3 pages.
Office Action for Japanese Application No. 2007-525302, issued Mar. 13, 2012.
Third Generation Partnership Project, Technical Specification Group Radio Access Network; Feasibility Study on Uplink Enhancements for UTRA TDD; (Release 6); 3GPP TR 25.804 V6.0.0 (Mar. 2005).
Non-Final Rejection, U.S. Appl. No. 13/726,976, dated May 22, 2014.
Office Action, Japanese Patent Application No. 2011-234218, dated Dec. 6, 2012.
Non-Final Rejection, U.S. Appl. No. 10/917,968, dated Jun. 18, 2014.
Final Rejection, U.S. Appl. No. 10/917,968, dated Jan. 8, 2010.
Non-Final Rejection, U.S. Appl. No. 10/917,968, dated Mar. 31, 2009.
Final Rejection, U.S. Appl. No. 10/917,968, dated Aug. 1, 2008.
Requirement for Restriction/Election, U.S. Appl. No. 10/917,968, filed Mar. 19, 2008.
Non-Final Rejection, U.S. Appl. No. 10/917,968, dated Jul. 2, 2007.
Non-Final Rejection, U.S. Appl. No. 13/727,153, dated May 22, 2014.
Notice of Allowance, U.S. Appl. No. 13/727,153, dated Sep. 10, 2014.
Notice of Allowance, U.S. Appl. No. 13/727,153, dated Feb. 6, 2015.
Office Action, Korean Patent Application No. 10-2007-7005478, dated Dec. 21, 2011 with English Translation.
Notice of Allowance, Korean Patent Application No. 10-2007-7005478, dated Jun. 7, 2012.
Notice of Allowance, Korean Patent Application No. 10-2012-7004514, dated Feb. 22, 2013.
Notice of Allowance, Korean Patent Application No. 10-2012-7004519, dated Dec. 26, 2012.
Notice of Allowance, Korean Patent Application No. 10-2012-7004526, dated Jun. 7, 2012.
Notice of Allowance, Korean Patent Application No. 10-2012-7020771, dated Jan. 30, 2013.

* cited by examiner

POWER CONTROL IN A WIRELESS NETWORK

CROSS REFERENCE TO RELATED APPLICATION

This application is a continuation of U.S. patent application Ser. No. 13/727,153, filed Dec. 26, 2012, which is a continuation of U.S. patent application Ser. No. 10/917,968, filed Aug. 12, 2004, which issued as U.S. Pat. No. 8,897,828 on Nov. 25, 2014, which are both incorporated by reference as if fully set forth.

This application is related to U.S. patent application Ser. No. 13/726,976, filed Dec. 26, 2012, which issued as U.S. Pat. No. 8,983,522 on Mar. 17, 2015.

BACKGROUND OF THE INVENTION

1. Field of the Invention

This invention relates to power control in a mobile radio system or wireless communication system, and more particularly, to controlling received power levels in a code division multiple access (CDMA) radio system.

2. Description of the Prior Art

Typically, radio signals transmitted with increased power result in fewer errors when received than signals transmitted with decreased power. Unfortunately, signals transmitted with excessive power may interfere with the reception of other signals sharing the radio link. Wireless communication systems employ power control schemes to maintain a target error rate of a signal received on a radio link.

If a received signal includes a rate of errors far above a target error rate, the received signal may result in an undesirable effect on a delivered service. For example, excessive errors may lead to broken voice during voice calls, low throughput over data links, and glitches in displayed video signals. On the other hand, if the received signal includes a rate of errors well below the target error rate, the mobile radio system is not efficiently using its radio resources. A very low error rate may mean that a signal is transmitted with an excessive level of power and that user could be provided a higher data rate. Alternatively, if the power level of a signal is sufficiently reduced, additional users may be serviced. If data rates are increased, a user may receive a higher level of service. Therefore, if a target error rate for each user is met within a tolerance threshold, a radio resource may be more optimally used.

A wireless communication system often employ one of either an open loop scheme or a closed loop scheme to control uplink transmit power of a mobile radio. Uplink typically refers to the radio link from a mobile radio to a base station, where as the downlink typically refers to the link from the base station to the mobile radio. A mobile radio is not necessarily mobile and may also be referred to as a mobile, a user, user equipment (UE), a terminal or terminal equipment. A base station may also be referred to as a Node-B.

The error rate is related to a received signal to noise-plus-interference ratio (SNIR); a higher SNIR generally results in a lower error rate; and conversely, a lower SNIR generally results in a higher error rate. The exact relationship between SNIR and error rate, however, is often a function of several factors including radio channel type and the speed at which a mobile is travelling.

A target error rate is often reached using a two stage process, which includes an outer loop and an inner loop. A first process may operate as an outer loop and may be tasked to adjust a target received SNIR (SNIR Target). This first process tracks changes in the relationship between SNIR and error rate. The outer loop sets an SNIR Target that is generally used several times by the inner loop. Periodically, the outer loop may adjust or update this SNIR Target used by the inner loop. For example, if an actual error rate exceeds a desired error rate, the outer loop may increase the value of the SNIR Target.

A second process operates as an inner loop and tries to force the link to exhibit the SNIR Target determined by the outer loop. The inner loop may operate by closed loop or by open loop means.

In the open loop method of the inner loop process, a UE uses an SNIR Target value that is derived by the network and signalled to the UE. The inner loop running in the UE attempts to maintain the SNIR Target. The UE uses the information signalled to it and monitors the received strength of signals it receives to determine a power level at which it will transmit. Advantageously, this open loop method compensates for fast channel fading by determining the path loss on a per frame bases and by adjusting the transmit power accordingly. Unfortunately, this open loop method is relatively slow at compensating for changes due to interfering signals from other transmitters.

In the closed loop method of the inner loop process, a closed loop scheme operates to match an SNIR Target. A received SNIR measurement is made by the network on an uplink signal. The SNIR measurement is compared within the network to the SNIR Target value. The inner loop drives the system to match the SNIR Target by issuing transmit power control commands from the network to a UE. The commands instruct the UE to increase or decrease its transmitted power by a predetermined step dB amount. Unfortunately, such closed loop methods demand a very high command update rate to adequately compensate for fast channel fading because of the single-dB-step commands used. At slower update rates, fast channel fading is not tracked adequately since a large number of iterations and long delays are needed to compensate for a change in power that is substantially larger than the dB-step value.

Both the closed loop scheme and the open loop scheme have their disadvantages. Therefore, an improved method and system are needed that better balances the conflicting goals of reducing errors in a received signal while also reducing interference imposed on signals received at other receivers. An improved method and system are also needed to better reduce the overall residual SNIR fluctuations experienced by each users signal at a receiver.

BRIEF SUMMARY OF THE INVENTION

Some embodiments provide a method of power control in a radio communications system, the method comprising: determining a path loss of a radio channel between a base station and a remote transceiver; receiving a transmit power control (TPC) command transmitted to the remote transceiver from the base station; and calculating a transmit power level for the remote transceiver based on the path loss and the TPC command.

Some embodiments provide a method of power control in a radio communications system, the method comprising: receiving a signal at a second transceiver transmitted from a first transceiver; measuring a power level of the received signal; receiving a transmit power control (TPC) command at the second transceiver transmitted from the first transceiver; and calculating a transmit power level for the second transceiver based on the power level of the received signal and the TPC command.

Some embodiments provide a method of uplink power control in a CDMA radio communications system, the method comprising: receiving an uplink signal; determining an error metric of the uplink signal; updating an SNIR target based on the error metric; measuring a received SNIR of the uplink signal; comparing the measured received SNIR with the SNIR target; assigning a first value to a step indicator if the measured received SNIR is greater than the SNIR target, and assigning a second value to a step indicator if the measured received SNIR is less than the SNIR target; transmitting a transmit power control (TPC) command instructing a transmitter to adjust an uplink transmit power level based on the step indicator; receiving the TPC command including the step indicator; accumulating the step indicator value; broadcasting a downlink signal including an indication of a downlink power level, wherein the signal is transmitted at the downlink power level; measuring the received power of the downlink signal; and setting a transmit power level base on the received power level, the indication of the downlink power level, and the accumulated step indicator value.

Some embodiments provide a method comprising: measuring a power level of a received signal; receiving a transmit power control (TPC) command; and calculating a transmit power level based on the power level of the received signal and the TPC command.

Some embodiments provide a radio comprising: a receiver including an output to provide a measured received power level; an accumulator having an input for accepting step increase and decrease instructions and an output providing a sum of past step instructions; a power level setting circuit coupled to the accumulator output and coupled to the receiver output, wherein the power level setting circuit sets a transmit power bases on the accumulator output and the measured received power level; and a transmitter, wherein the transmitter transmits a signal at the set transmit power.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION OF THE INVENTION

In the following description, reference is made to the accompanying drawings which illustrate several embodiments of the present invention. It is understood that other embodiments may be utilized and mechanical, compositional, structural, electrical and operational changes may be made without departing from the spirit and scope of the present disclosure. The following detailed description is not to be taken in a limiting sense, and the scope of the embodiments of the present invention is defined by the claims of the issued patent.

Some portions of the detailed description which follows are presented in terms of procedures, steps, logic blocks, processing, and other symbolic representations of operations on data bits that can be performed on computer memory. A procedure, computer executed step, logic block, process etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
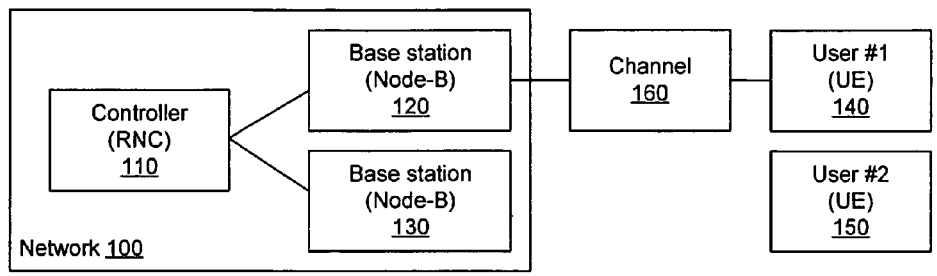
FIG. 1 shows a block diagram of a wireless communication system.

FIG. 1 shows a block diagram of a wireless communication system. A network 100 may include one or more base station controllers 110, such as a radio network controller (RNC), and one or more base stations 120 and 130, such as a Node-B, wherein each Node-B is connected to an RNC. The network 100 communicates with one or more users 140, 150 through a channel 160, also referred to as a radio link, created between a base station and a user.

Two mechanisms are primarily responsible for changes in the SNIR of a signal travelling through a radio link.

First, changes in the channel affect the SNIR. The instantaneous path loss between a base station and a user may vary as the user changes position or the user's environment changes. Rapid changes may occur as a result of a transmitted signal combining constructively and destructively as the signal travels along multiple paths from a base station and to the user. Additionally, slower changes may occur due to attenuation of the radio waves with increased distance between the base station and the user. Slower changes may also occur due to signal obstruction by buildings, vehicles and hills.

Second, signals from other transmitters affect the SNIR. For example, signals intended for other mobile radios or other base stations may increase interference in the radio link and thus reduce a received signal's SNIR.

In Time Division Duplex (TDD) systems, both uplink and downlink share the same carrier frequency. Due to this reciprocity in the links, path loss measurements made on the downlink by a mobile radio may be used estimate the path loss on the uplink. That is, a measured downlink path loss may be used to estimate the uplink path loss. The estimated uplink path loss will be less reliable with the passing of time but may be adequate within a frame period. Therefore, a mobile radio may determine a transmit power level for an uplink transition that compensates for an estimated uplink path loss, thereby providing a received signal to a base station at an expected input power level.

Downlink path loss measurements may be facilitated by a beacon channel, which is transmitted from a base station at a reference power level. A mobile radio is informed of the actual transmit power level being used by the base station for the beacon channel. In addition to knowing the actual transmit power level of a beacon channel, the mobile radio may measure a received signal power level. By measuring the received signal power level, the mobile radio can compute a downlink path loss as the difference between the actual transmit power level and the received signal power level. Thus, the mobile radio is able to estimate the uplink path loss in a channel between the base station and the mobile radio and properly set its uplink transmit power level.

The path loss calculation may be updated as often as a beacon signal is transmitted and received. In a UTRA TDD system in compliance with the third generation partnership project (3GPP) specifications, a beacon signal is transmitted either once or twice every 10 milliseconds (ms). If an uplink transmission follows a beacon transmission within a relatively short period of time, a mobile radio can compensate for the fast fluctuations (fast-fading) in a radio channel. Such is the case for mobiles travelling at slow to moderate speeds if a beacon signal is transmitted either once or twice every 10 ms and the uplink transmissions occur in the intervening period.

Additionally, a radio channel may be adversely affected by changes in interference levels over time. These temporal interference changes may be accommodated by a base station, measuring and communicating interference levels seen in each uplink timeslot. In a UTRA TDD system, a table having values of the measured interference for each timeslot may be broadcast to all users via a Broadcast Channel (BCH). The broadcasted information may be updated approximately every 16 frames (160 ms) depending upon the system configuration. In other embodiments, a mobile radio may receive this interference table as a signalled message directed to the individual mobile radio.

The 3GPP specifications describe two separate schemes for power control of uplink channels: an open loop scheme and a closed loop scheme. For example, in 3GPP 3.84 Megachips per second (Mcps) TDD systems, open loop power control is specified for all uplink channels. In 3GPP 1.28 Mcps TDD systems, open loop power control is specified only for physical random access channels (PRACH). Also defined by 3GPP is an implementation of a closed loop power control scheme. For example, see 3GPP recommendations for UTRA TDD systems operating at 1.28 Mcps for non-PRACH uplink channels.

In a wireless communication system using an open loop scheme, a network and UE use an outer loop to update and signal to the UE an SNIR Target value, thereby influencing the UE's transmit power. The network updates the SNIR Target value to be signalled based upon an observed error rate on the uplink. Once received, the mobile radio takes into account the signalled SNIR Target value when deriving a transmit power level that it will apply to the next uplink signal transmitted.

In a 3GPP 3.84 Mcps system incorporating an open loop scheme, a network instructs the UE with an SNIR Target value. The network also signals its beacon transmit power level and may also provide a measure of uplink interference for each timeslot as measured by the network. The UE receives an input signal that is typically a combination of attenuated versions of the network signal, which passed through a radio channel, along with interfering signals from other transmitters. The UE measures the received power level of the attenuated network signal and determines a path loss of the radio channel. The UE also decodes the signalled SNIR Target value from the network signal. The UE computes a transmit power level based on the SNIR Target value, the determined path loss and, if available, the uplink interference measurements.

Figure 2:
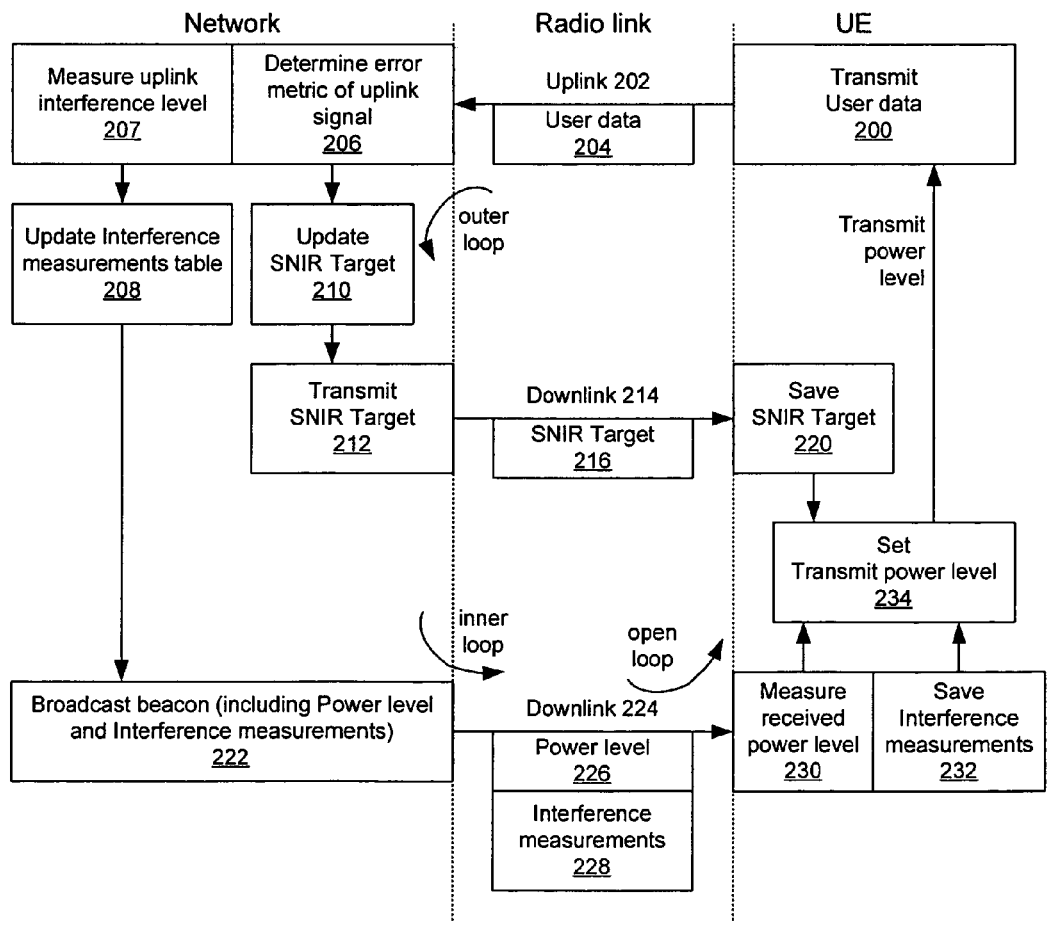
FIG. 2 illustrates a wireless communication system using an open loop scheme.

FIG. 2 illustrates a wireless communication system using an open loop scheme. A UE transmits 200 user data at a determined transmit power level. An uplink signal 202, which includes user data 204, propagates through the radio link. The network receives an attenuated version of the transmitted signal. The network measures 207 an uplink interference value and determines 206 an error metric of the uplink signal. The network may use the measured uplink interference value to update 208 an interference measurement table. The interference measurement table may include average measured interference levels for each uplink timeslot.

The network also uses the error metric to update 210 an SNIR Target value. The network transmits 212 SNIR Target in a signalling message on the downlink 214, which includes the SNIR Target 216. The UE receives and saves 220 the SNIR Target. The network also broadcasts 222 a beacon signal on the downlink 224. The downlink 224 propagates the signal, which includes an indication of the beacon power level 226, over the radio link. The network may also broadcast the interference measurements 228. The UE measures 230 the received power level and saves 232 the interference measurements for later processing.

With the measured power level and the signalled beacon power level, the UE may determine a path loss. The UE may use the saved received SNIR Target 216, the saved received interference measurements 228 and the computed path loss to set 234 a transmit power level. This transmit power level may be used by transmitter 200 to set the power level of transmitted user data 204 on the uplink 202.

The 3GPP specifications also define a closed loop scheme. For example, a 3GPP 1.28 Mcps system employs a closed loop scheme using an outer loop and an inner loop. The closed loop TPC scheme is the primary power control mechanism used for all non-PRACH channels in a 1.28 Mcps TDD system. The closed loop TPC scheme is not currently employed for the uplink of 3.84 Mcps TDD systems.

The outer loop determines an SNIR Target value and the inner loop uses the SNIR Target value. The outer loop includes network components that determine an error metric, such as a bit error rate, a block error rate or a CRC error count, on uplink traffic from UEs. This error metric is used to set and update an SNIR Target value. An inner loop includes network components that use the SNIR Target value computed and set by the outer loop. The network measures a received SNIR value of the uplink signal.

Next, a comparator determines whether the measured SNIR value is greater than or less than the SNIR Target value. If the measured SNIR value is greater than the SNIR Target value, the network signals a transmit power control (TPC) command on the downlink instructing the UE to reduce its current transmitter power by a step value (e.g., 1 dB). On the other hand, if the measured SNIR value is less than the SNIR Target value, the network signals a TPC command instructing the UE to increase its current transmitter power by the step dB value.

In a system employing only a closed loop power control scheme, several TPC commands may be necessary to properly bring the UE's transmitted power in line with the SNIR Target value. For example, if a path loss increases from one frame to the next by 15 dB, the system will take 15 TPC commands to compensate for the 15 dB fade. A UE accumulates the increase and decrease TPC commands to determine a proper uplink transmit power level. By increasing and decrease uplink power levels of each UE, a network attempts to control the power level of each UE such that the ratio of the received uplink energy level per transmitted bit to the spectral density of the noise and interference signals is a constant value. This TPC command adjustment process is performed for each UE in a cell. The constant value, however, may be non-uniform among the UEs depending upon the configuration of the system.

In a closed loop TPC scheme, the inner loop SNIR is maintained via a closed loop method using binary feedback. The feedback indicates either power up or power down. Every time a TPC command is received an integrator in the UE is used within the inner loop to update the UE transmit power by a step amount +/−Δ dB. The TPC commands themselves are derived by the network and are signalled to the UE via a downlink channel. When calculating the proper TPC command to send, the network measures the received SNIR and compares this measured value to an SNIR Target value. If the SNIR is too low, an up command is sent. If the SNIR is too high, a down command is sent. The target SNIR value is updated by the outer loop based upon the observed error performance of the link. In this way, both the inner and outer feedback loops are closed by the TPC signalling.

Figure 3:
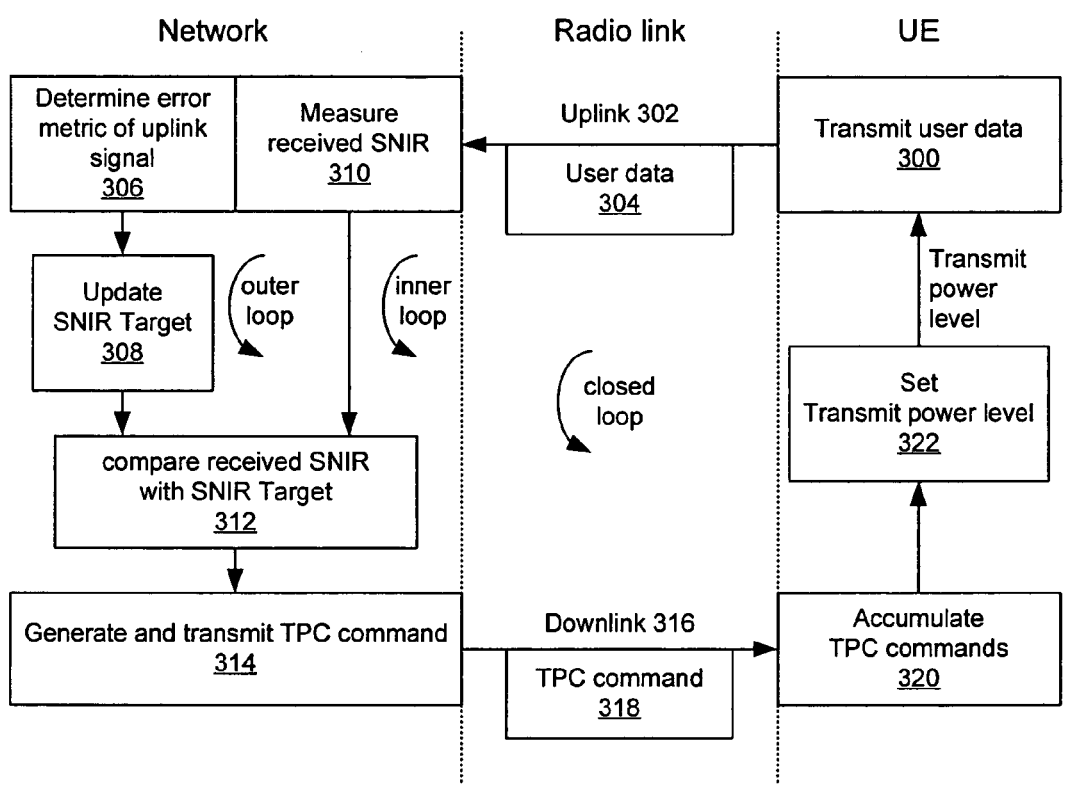
FIG. 3 illustrates a wireless communication system using a closed loop scheme.

FIG. 3 illustrates a wireless communication system using a closed loop scheme. The closed loop scheme includes an outer loop in which a UE transmits 300 user data over the radio link in an uplink signal 302 that contain the user data 304. The network determines 306 an error metric of the received uplink signal. Using the error metric, the network computes and updates 308 an SNIR Target value.

The closed loop scheme also includes an inner loop in which the network measures 310 the received SNIR of the uplink signal 302. The network compares 312 the measured SNIR with the SNIR Target determined in the outer loop. The inner loop generates and transmits 314 a TPC command based on the comparison 312. A downlink signal 316 carries the TPC command 318 over the radio link. The UE accumulates 320 the TPC commands and uses the accumulated TPC commands to set 322 a transmit power for future uplink transmissions 300.

A mobile radio system employing either an open loop scheme or a closed loop scheme has its advantages and disadvantages.

The open loop scheme advantageously adapts quickly to path loss changes. If the path loss is observed to have worsened, for example by 15 dB in one 10 ms interval, the transmit power may be adjusted accordingly. A further advantage is that the open loop may continue to be partially updated in the absence of user-specific feedback signalling. For example, when a UE does not receive updated SNIR Target values, the outer loop pauses but changes in the path loss may continue to be tracked.

Disadvantageously, the timeslot interference level update rate in an open loop system is relatively slow. Therefore, a system using an open loop scheme is slower to adapt to interference changes than a system using the closed loop scheme. A further disadvantage of the open loop scheme is that interference is considered to be the same for all UEs in a particular uplink timeslot. That is, each UE assigned to a timeslot uses the same interference measurement signalled by the base station on the BCH. A commonly used interference measurement table makes assumptions about the statistical nature of the interference and does not consider the individual cross-correlation properties of the uplink channelization codes. It is thus left to the outer loop to compensate for these effects, but unfortunately on a slow basis.

Conversely, the closed loop only scheme is less able to adapt to fast path loss changes because the closed loop can only move by a step Δ dB during each update. Thus, if the path loss has changed between updates by 15 dB and the step Δ dB value is only 1 dB, the closed loop is not able to adjust quickly since it can move only by 1 dB during each cycle. Therefore, for the same update rate (e.g., once per 10 ms), a closed loop TPC scheme is less able to track the fast fading observed in common mobile radio channels. Furthermore, the closed loop may not be updated during a pause in transmission of the TPC commands.

Advantageously, the closed loop is relatively quick to respond to uplink interference changes since both path loss and interference are accommodated by the same loop. The closed loop scheme using TPC commands has a further advantage in that it allows for per-user interference adaptation, in contrast to the open loop scheme, which broadcasts an average interference table for each timeslot.

In accordance with the present invention, aspects of both an open loop scheme and a closed loop scheme are strategically combined to form a power control method. Some embodiments of the present invention advantageously combine elements of both open loop and closed loop schemes to control power levels, thereby avoiding one or more of the disadvantages associated with either of the separately used schemes.

In accordance with some embodiments of the present invention, a UE incorporates the TPC structure of a closed loop scheme and the path loss estimation structure of an open loop scheme. Some embodiments of the present invention allow for both relatively quick adaptation to fast fading and also allow for per-user interference adaptation, and retain the ability to partially update the power control loop even in the temporary absence of TPC commands.

Some embodiments of the present invention require modifications to one or more elements of a standard mobile radio system. For example, some embodiments require changes to just a UE, while other embodiments require modifications to just the network. Embodiments that modify a UE but not the network allow the UE of the present invention to operate with legacy base stations. Similarly, embodiments that modify the network but not the UE allow the network of the present invention to operate with legacy UEs. Still other embodiments of the present invention require modification to both the network and the UE. Embodiments modifying standard network elements may include changes to just a base station but not a radio network controller (RNC). Other embodiments modify both a base station and an RNC.

Some embodiments of the present invention, incorporate a loop having three components: an open loop component located in the UE, an SNIR comparison loop located in the network, and an SNIR update component also located in the network.

First, an open loop component may be located in the UE and driven by measured beacon received power levels and path loss calculations. This loop tries to adapt to all instantaneous path loss changes on a per-beacon transmission basis. The partial power calculated by this loop is a function of the beacon signal transmission power ($P_{Tx}$) and the beacon received signal code power (RSCP) and is denoted $P_{open}(k)$, where k represents the current frame number. $P_{Tx}$ is known to the UE and derived from the base station signalled power level (428, FIG. 4) and the measured power level for frame k, (RSCP(k)), may be determined by the UE receiver (432, FIG. 4). $P_{open}(k)$ may also be a function of a constant value (C) to ensure that the transmission arrives at an appropriate power level.

$$P_{open}(k) = P_{Tx} - RSCP(k) + C$$

Second, an SNIR comparison loop is located in the network, such as in the Node-B. The SNIR comparison loop is driven by received SNIR metrics. A received SNIR is compared to a SNIR Target value, which is set by an outer loop. A comparison result leads to the signalling of a TPC command that is signalled to the UE to change its transmit power. Binary signalling may be used, such that the TPC command indicates a change in transmission power by a fixed amount either up or down. Alternately, a multi-level TPC command may be used.

Third, an outer loop is located in the network, such as in the Node-B or RNC. The outer loop is driven by the data error statistics observed on the uplink transmissions. The outer loop is responsible for setting an SNIR Target level for the SNIR comparison loop.

An optional auxiliary process in the UE adjusts the transmit power based upon: (a) $y_{SF}$, the spreading factor (SF) of the physical channel; and (b) $\beta_{TFC}$, the selected transport format (TFC).

Thus, for the current frame k, the UE may calculate the transmit power $P_{Tx}(k)$ as shown below where K is the initial frame number determined when the power control process begins; TPCi is −1 for a down TPC command, +1 for an up TPC command and 0 if no TPC command is received; and step is the magnitude of the amount added to an accumulator upon receipt of each TPC command. The transmit power $P_{Tx}(k)$ may be updated for every frame period. Alternatively, the transmit power $P_{Tx}(k)$ may be updated each time a new TPC command is received. Alternatively, the transmit power $P_{Tx}(k)$ may be updated only when either a TPC command or a new power level is received from the network.

$$P_{Tx}(k) = P_{open(k)} + step \cdot \sum_{i=k-K}^{k} TPC_i + y_{SF} + \beta_{TFC}$$

Figure 4:
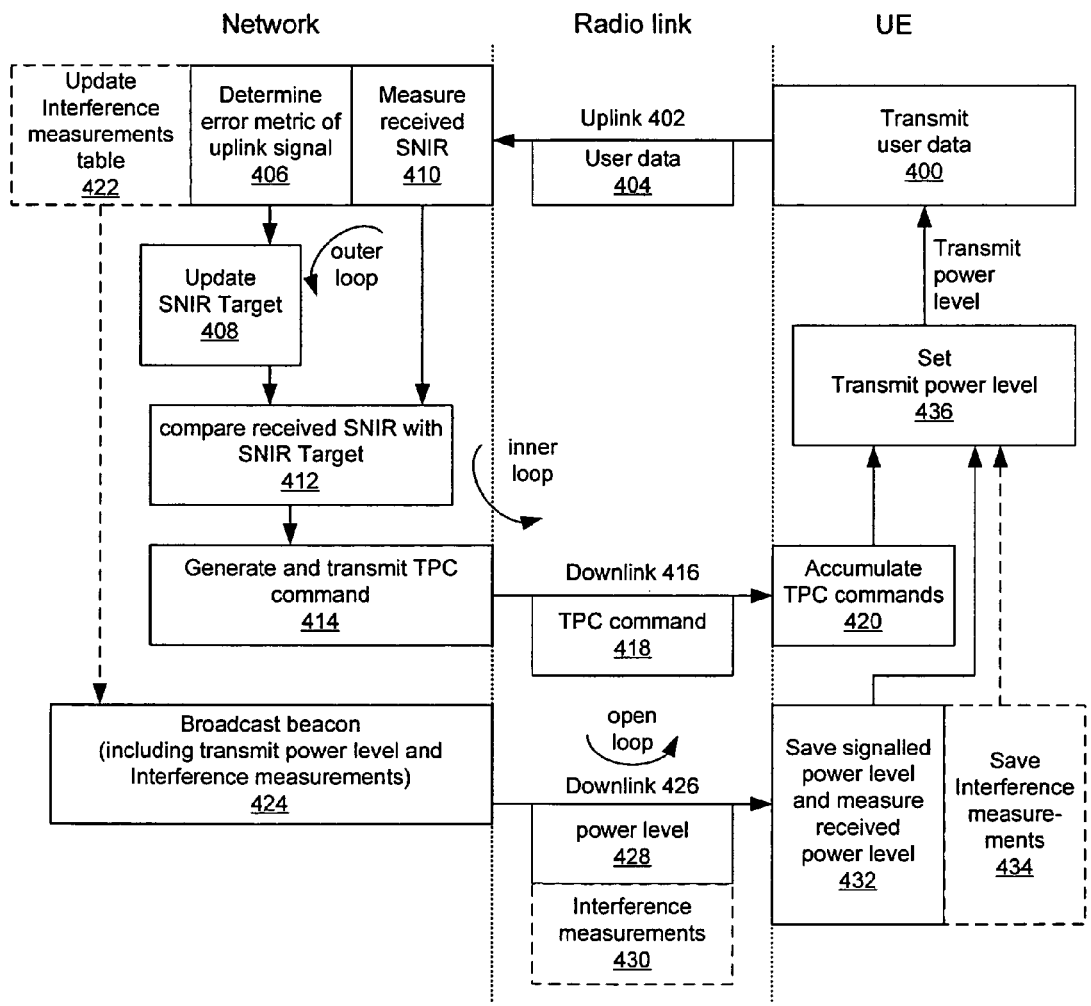
FIG. 4 illustrates a wireless communication system using elements of both open loop and closed loop schemes, in accordance with the present invention.

An embodiment of a power control scheme, in accordance with the present invention, is shown diagrammatically in FIG. 4. The $y_{SF}$ and $\beta_{TFC}$ adjustment factors are not shown for diagrammatical clarity.

FIG. 4 illustrates a wireless communication system using elements of both open loop and closed loop schemes, in accordance with the present invention. A UE transmits 400 user data at a determined transmit power level. An uplink signal 402, which includes the user data 404, propagates through the radio link. The network receives an attenuated version of the transmitted signal.

The network determines 406 an error metric of the uplink signal 402. Optionally, the network measures an uplink interference level and may update 422 an interference measurement table. Data measured or computed from uplink measurements may be entered into the interference measurement table. The interference measurement table may include average measured interference levels for each uplink timeslot. Within the network the error metric may be used to update 408 an SNIR Target value.

The network also transmits 424 a beacon signal. The downlink signal 426, which includes an indication of the beacon transmit power level 428, propagates over the radio link. Optionally, the network may broadcast the interference measurements 430. The UE saves 432 the signalled power level, measures the received power level and, if available, saves 434 the interference measurements for later processing.

As in a closed loop scheme, a UE transmits 400 user data over the radio link in an uplink signal 402 that contain the user data 404. The network determines 406 an error metric of the received uplink signal. Using the error metric, the network computes and updates 408 an SNIR Target value.

The network also measures 410 the received SNIR of the uplink signal 402. The network compares 412 the measured SNIR with the determined SNIR Target. The network generates and transmits 414 a TPC command based on the comparison 412. A downlink signal 416 carries the TPC command 418 over the radio link. The UE accumulates 420 the TPC commands and uses the accumulated TPC commands in part to set 436 the transmit power level for future uplink transmissions 400.

As in an open loop scheme, with the measured power level and the signalled beacon power level, the UE may determine a path loss $P_{open}(k)$. The UE may use the saved received interference measurements I(k) to adjust the transmission power following a pause in transmission or following a pause in receipt of TPC commands. The UE may use the accumulated TPC commands $$\sum_{i=k-K}^{k} TPC_i$$

the computed path loss $P_{open}(k)$, adjustment factors $y_{SF}$ & $\beta_{TFC}$ and optionally, adjustments based upon I(k) to set 436 a transmit power level. This transmit power level $P_{Tx}(k)$ may be used to set the uplink power level of transmitted 400 user data on the uplink 402.

The downlink signal 426, which contains the power level 428 and may contain the interference measurements 430, is broadcast in a cell. Previous UEs using a closed loop scheme do not use measurements of the downlink received power while monitoring the power level signalling in a beacon broadcast to set the uplink transmission power. Similarly, previous UEs using a closed loop scheme do not compute or do not use computations of the downlink path loss while processing TPC commands. A previous UE simply follows the TPC commands as it is instructed to set its transmit power level. If a network instructs a known UE to increase its transmit power by one step amount, the previous UE shall increase its power level by one step amount.

In accordance to the present invention, a UE may receive a TPC command instructing it to change its transmit power by one step level in a particular direction, but the UE may actually change its transmit power level by a different amount or in fact an amount in the opposite direction. The UE uses the TPC only as a factor in determining whether to increase transmit power level, decrease transmit power level or leave the transmit power level unchanged.

For example, assume a UE just transmitted a burst to a Node-B at 20 dBm over a radio link with a path loss of 110 dB. The received power at the Node-B receiver would be −90 dBm, which is the difference between 20 dBm and a loss of 110 dB. Next, assume the Node-B wants to receive an uplink signal from the UE at −89 dBm. The Node-B would signal and the UE would receive a TPC command instructing the UE to increase the uplink transmit power level by 1 dB. Also assume that the path loss improves from the previous frame to this frame by +10 dB (e.g., from 110 dB to 100 dB).

A previous UE would transmit the next burst at +21 dBm, which is the sum of the previous level (+20 dBm) and the step increase (1 dB). The transmitted +21 dBm signal would probably reach the Node-B at −79 dBm, a signal level that is +10 dB too great because the channel improvement was not taken into account.

In accordance with the present invention, a UE would account for the new path loss. The previous transmit power level of +20 dBm would be decreased by +10 dB to account for the improved channel path loss of +10 dB. The resulting transmit power level would then be +10 dBm. The UE also accounts for the TPC command by adjusting the transmit power level by the desired step of +1 dB, resulting in a new transmit power level of +11 dBm, which both accounts for the improved channel (+10 dB) and accommodates the Node-B's desire to have a received signal with a step increase (+1 dB). The +11 dBm would reach the Node-B at the desired level of −89 dBm if the channel pathloss estimate was accurate. As shown in this example, the transmit power level dropped 9 dB (from +20 dBm to +11 dBm) even though the Node-B TPC command instructed an increase of 1 dB.

Therefore, even though a UE receives a network TPC command instructing it to step up or down its uplink transmit power by 1 dB, the UE may actually change the transmit power level by a different amount. In fact, the UE transmit power level may change in a direction opposite of the TPC command as exemplified above.

During a period of inactivity on the uplink 402, TPC commands 418 may not have been received by the UE. The UE transmit power level for a subsequent initial transmission 400 may be determined using current updates of the open loop component. That is, the initial transmit power level may be determined based on the beacon power level 428, the measured 432 received power level, and optionally the interference measurements 430. The open loop component does not require feedback, thus may continue to be updated every beacon transmission even during the uplink transmission pause.

The history stored in the TPC accumulator may be stale. In some circumstances the history may be considered useful and is not reset. Alternatively, the accumulated TPC history could be used to set the uplink transmit power level but with some excess power margin added to ensure a clean start to the loop. Alternatively, the UE may decide to discard the accumulated TPC history and to reset it to a default or initial value. The default or initial value may optionally be based upon a received interference measurement table 430.

The ability of the open loop component to compensate for fast fading is a function of the channel speed and the delay between the beacon timeslot and the uplink timeslots. Open loop control is often effective at pedestrian speeds as well as at higher speeds if the uplink slots are placed close in time to the beacon. At high mobile speeds, it is likely that power control performance will be improved if beacon RSCP filtering is enabled at the UE. The UE is responsible for detecting whether or not filtering should be applied to the open loop component. Automatic detection of the channel speed may be performed by the UE in order to control the enabling of RSCP filtering. In some embodiments of the present invention, a UE disables a combined open loop/closed loop scheme operating in accordance with the present invention when a UE passes a threshold value indicative of mobile speed.

Simulations have been performed to illustrate the performance advantages of some embodiments of the present invention. The radio channel simulated here represents an ITU indoor to outdoor and pedestrian model B channel as described in ITU-R M.1225 Guidelines for Evaluation of Radio Transmission Technologies for IMT-2000. The outer loop SNIR target was based upon a 1% error rate. A residual SNIR error term observed at the base station was monitored.

Figure 5A:
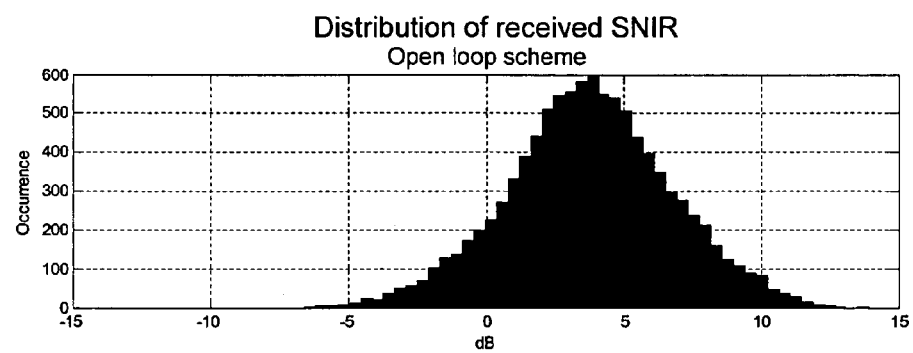
FIGS. 5A, 5B and 5C each illustrate a simulated probability density function of the received SNIR in the network.
Figure 5B:
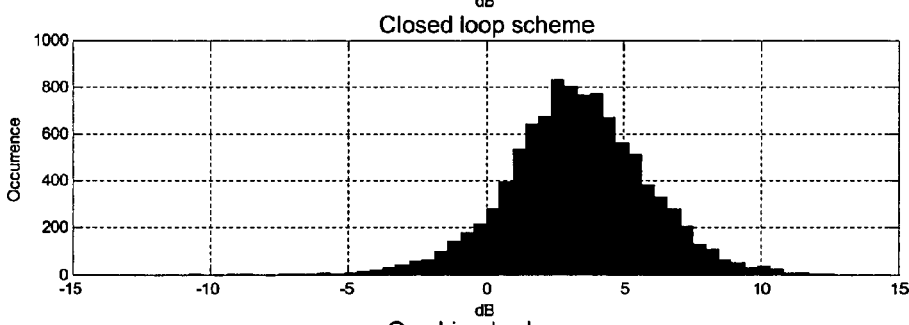
Figure 5C:
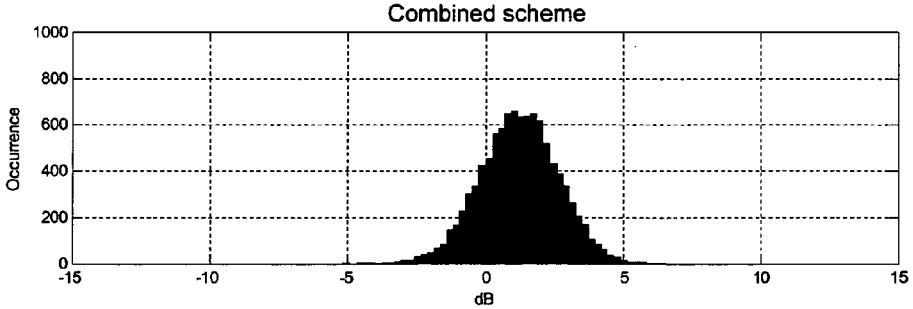

FIGS. 5A, 5B and 5C each illustrate a simulated probability density function of the received SNIR in the network. In each of the simulations, approximately 10,000 received SNIR values are sampled. Simulation results for each scenario are grouped and collected into bins. The vertical axis shows a number of occurrences for a particular range (bin) of received SNIR values. A sampled received SNIR value that fall within a range defined by a bin is counted as an occurrence for that bin.

FIG. 5A shows simulation results for a system using only an open loop scheme. In this plot, the bin width is approximately 0.42 dB. The simulation results show a system good at tracking fast fading in the channel, but not as able to track the interference variations included in the simulation. These values are only updated at the UE via signalling every 160 ms. As such, the error term shows considerable variance at the receiver.

FIG. 5B shows simulation results for a system using only a closed loop scheme. In this plot, the bin width is approximately 0.48 dB. The simulation results show a system better able to track the interference changes, but not as able to track the path loss due to being limited in response to the TPC command+/−1 dB step size.

FIG. 5C shows simulation results for a system combining aspects of both open and closed loop schemes (as shown in FIG. 4). In this plot, the bin width is approximately 0.24 dB. The simulation results show a system able to respond to both path loss and interference changes. Additionally, the residual SNIR error term shows less variance. The plot shows that the variance of this distribution is considerably reduced for the combined power control scheme.

For the above simulations (using the same fading and interference profiles for each loop method), the following mean transmit powers were obtained:

TABLE 1

Performance of Power Control Schemes

| Power Control Method | Mean Transmit Power for 1% BLER |
| --- | --- |
| Open Loop: (FIG. 2) | 5.76 dB |
| Closed Loop: (FIG. 3) | 5.48 dB |
| Combined Loops: (FIG. 4) | 3.59 dB |

For the simulated channel and interference scenario, the combined scheme is able to maintain a 1% block error rate (BLER) using 2.17 dB less power than the open loop scheme and 1.89 dB less power than the closed loop scheme. In a real system, this power saving may equate to greater cell coverage, higher uplink capacity and throughput, and increased battery life. The magnitude of the gains may change with different channel speeds, types and interference profiles but the performance of the combined should be better than both the open loop and closed loop schemes when used individually.

In terms of signalling overhead, the combined scheme helps to avoid a need to signal SNIR Target and interference levels on downlink channels, and has a similar signalling efficiency as the closed loop scheme. In some embodiments, the signalling efficiency is 1 bit per update.

In a system using the combined power control scheme, a new physical channel on the downlink may be used to carry fast allocation and scheduling information to a user, thereby informing the UE of the uplink resources that it may use. This new physical channel could also be used as the feedback channel for the combined power control scheme. For example, an allocation/scheduling channel could carry TPC commands. Alternatively, the combined scheme may be applied to existing channel types (dedicated or shared uplink physical channels) for UTRA TDD as well as to other TDD systems.

Some embodiments of the present invention control uplink power levels and may be incorporated into a UE with supporting features incorporated into a base station. For example, a Node-B or RNC may be implemented with a new parameter, either included in a signalling command or a broadcast message, where the new parameter instructs a UE to enable or disable the setting of uplink transmit power level based on both the path loss estimation and the TPC commands. A parameter may indicate whether a UE is to use open loop power control, closed loop power control or a combined scheme.

Some embodiments of the present invention operate with a downlink signal including both a TPC command and an indication of the downlink transmit power level. In these embodiments, the downlink signal provides both downlinks 416 and 430 (FIG. 4) in one signal. A UE may receive one physical channel that it decodes for TPC commands, decodes for downlink power level indications, and measures for received power levels. In these embodiments, the UE measures a power level of a received signal, receives a TPC command, and calculates a transmit power level based on the power level of the received signal and the TPC command.

While the invention has been described in terms of particular embodiments and illustrative figures, those of ordinary skill in the art will recognize that the invention is not limited to the embodiments or figures described. For example, the combined uplink power control scheme described above may be implemented a mirror image for controlling downlink power. In this case, functions performed by the UE for a combined uplink scheme may be performed by the network. Similarly, functions performed by the network for the combined uplink scheme may be performed by the UE.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method comprising:
   transmitting, by a first network device, an indication of a transmission power level of the first network device so that a user equipment (UE) can determine a path loss;
   transmitting, by the first network device to the UE, an indication of whether accumulation of transmit power control (TPC) commands is enabled;
   transmitting, by the first network device on a single channel to the UE, a multilevel TPC command and scheduling information related to a shared uplink channel;
   receiving, by the first network device from the UE on the shared uplink channel, an uplink signal, wherein transmission power level of the uplink signal is based on the multilevel TPC command and the path loss determined with the indication of the transmission power level of the first network device; and
   transmitting, by the first network device to a second network device, data of the uplink signal.

2. The method of claim 1 further comprising:
   accumulating, by the UE, TPC commands if the indication of whether accumulation of TPC commands is enabled indicates accumulation is enabled.

3. The method of claim 1 further comprising:
   setting, by the UE, uplink transmission power level of the uplink signal based on the multilevel TPC command, a determined path loss, and a format of the uplink signal.

4. The method of claim 1, wherein the first network device is any one of a Node-B or a base station and the second network device is any one of a controller, a radio network controller (RNC), or a base station controller.

5. A wireless system comprising:
   a first network device configured to transmit an indication of a transmission power level of the first network device so that a user equipment (UE) can determine a path loss;
   the first network device is further configured to transmit, to the UE, an indication of whether accumulation of transmit power control (TPC) commands is enabled;
   the first network device is further configured to transmit, on a single channel to the UE, a multilevel TPC command and scheduling information related to a shared uplink channel;
   the first network device is further configured to receive, from the UE on the shared uplink channel, an uplink signal, wherein transmission power level of the uplink signal is based on the multilevel TPC command and the path loss determined with the indication of the transmission power level of the first network device; and
   the first network device is configured to transmit, to a second network device, data of the uplink signal.

6. The wireless system of claim 5 further comprising:
   the UE configured to accumulate TPC commands if the indication of whether accumulation of TPC commands is enabled indicates accumulation is enabled.

7. The wireless system of claim 5 further comprising:
   the UE is configured to set uplink transmission power level of the uplink signal based on the multilevel TPC command, a determined path loss, and a format of the uplink signal.

8. The wireless system of claim 5, wherein the first network device is any one of a Node-B or a base station and the second network device is any one of a controller, a radio network controller (RNC), or a base station controller.

9. A network device comprising:
   a transmitter configured to transmit an indication of a transmission power level of the network device so that a user equipment (UE) can determine a path loss;
   the transmitter is further configured to transmit, to the UE, an indication of whether accumulation of transmit power control (TPC) commands is enabled;
   the transmitter is further configured to transmit, on a single channel to the UE, a multilevel TPC command and scheduling information related to a shared uplink channel; and
   a receiver configured to receive, from the UE on the shared uplink channel, an uplink signal, wherein transmission power level of the uplink signal is based on the multilevel TPC command and the path loss determined with the indication of the transmission power level of the network device.

10. The network device of claim 9 further comprising:
    the transmitter is further configured to transmit, to a second network device, data of the uplink signal.

11. A method performed by a network device, the method comprising:
    transmitting, by the network device, an indication of a transmission power level of the network device so that a user equipment (UE) can determine a path loss;
    transmitting, by the network device to the UE, an indication of whether accumulation of transmit power control (TPC) commands is enabled;
    transmitting, on a single channel to the UE, a multilevel TPC command and scheduling information related to a shared uplink channel; and
    receiving, from the UE on the shared uplink channel, an uplink signal, wherein transmission power level of the uplink signal is based on the multilevel TPC command and the path loss determined with the indication of the transmission power level of the network device.

12. The method of claim 11 further comprising:
transmitting, to a second network device, data of the uplink signal.

* * * * *